United States Patent
Cole et al.

[11] Patent Number: 5,474,235
[45] Date of Patent: Dec. 12, 1995

[54] SPRAY NOZZLE INSERT AND METHOD FOR REDUCING WEAR IN SPRAY NOZZLES

[75] Inventors: Arthur W. Cole, Rowley, Mass.; Dennis Tulenko, Pittsburg, Pa.

[73] Assignee: Wheelabrator Technologies, Inc., N.H.

[21] Appl. No.: 402,024

[22] Filed: Mar. 10, 1995

Related U.S. Application Data

[63] Continuation of Ser. No. 227,053, Apr. 13, 1994, abandoned.

[51] Int. Cl.⁶ .................................................. B05B 7/04
[52] U.S. Cl. ........................... 239/431; 239/434; 239/600
[58] Field of Search ................................ 239/418, 423, 239/430, 431, 434, 429, 590.3, 600

[56] References Cited

U.S. PATENT DOCUMENTS

| | | | |
|---|---|---|---|
| Re. 34,586 | 4/1994 | Spink et al. | 239/431 X |
| 2,933,259 | 4/1960 | Raskin | 239/431 X |
| 3,129,777 | 4/1964 | Haspert | 239/600 X |
| 3,558,063 | 1/1971 | Goff | 239/431 X |
| 4,101,073 | 7/1978 | Curran | 239/431 X |
| 4,263,021 | 4/1981 | Downs et al. | 95/224 |
| 4,411,389 | 10/1983 | Harrison | 239/600 X |
| 4,625,916 | 12/1986 | Nieuwkamp et al. | 239/431 |
| 4,819,878 | 4/1989 | Bailey et al. | 239/430 X |
| 4,846,402 | 7/1989 | Sandell et al. | 239/429 X |
| 4,865,817 | 9/1989 | Burgess et al. | 422/168 |
| 4,893,752 | 1/1990 | Spink et al. | 239/427.3 |
| 4,936,512 | 6/1990 | Tremoult, Jr. | 239/600 X |
| 4,963,329 | 10/1990 | Burgess et al. | 422/168 |
| 5,023,064 | 6/1991 | Burgess et al. | 423/243.08 |
| 5,025,989 | 6/1991 | Spink et al. | 239/431 |
| 5,045,245 | 9/1991 | Chawla | 261/44.2 |
| 5,170,942 | 12/1992 | Spink et al. | 239/431 X |

FOREIGN PATENT DOCUMENTS 9212786  8/1992  WIPO.

*Primary Examiner*—Andres Kashnikow
*Assistant Examiner*—Lesley D. Morris
*Attorney, Agent, or Firm*—Banner & Allegretti, Ltd.

[57] ABSTRACT

The present invention relates to a replaceable nozzle insert adapted to be removably received and secured within the atomization port of a spray nozzle. The spray nozzle is then, in turn, used to atomize a two fluid mixture, typically slurry and gas. The nozzle insert is configured to provide for the use of highly abrasion-resistant materials in the construction of the insert, thereby significantly increasing the average life of the nozzle insert. The improved features of the nozzle insert include a two-piece design having an insert sleeve and an insert retaining cap. The insert sleeve portion of the nozzle insert has an interior fluid-conveying and gas flow passages therein and can be received into the atomization and inner body ports of the spray nozzle. The insert retaining cap cooperates with both the insert sleeve and the spray nozzle to secure the insert sleeve in place in the spray nozzle.

25 Claims, 2 Drawing Sheets

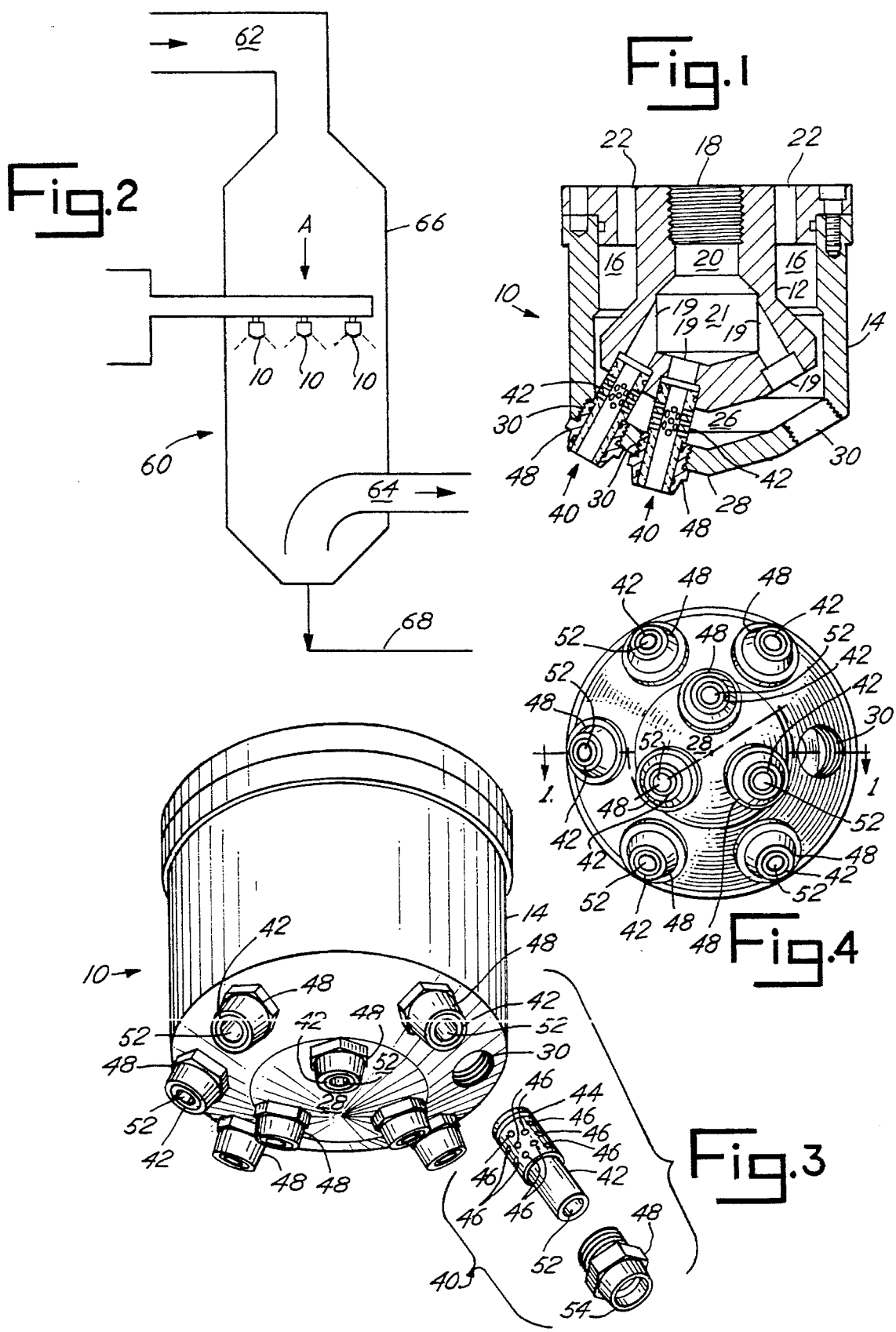

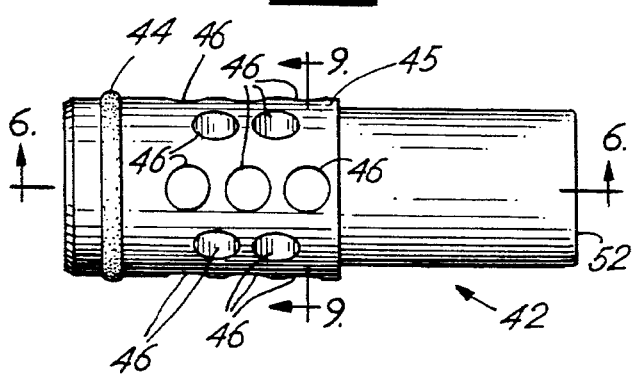
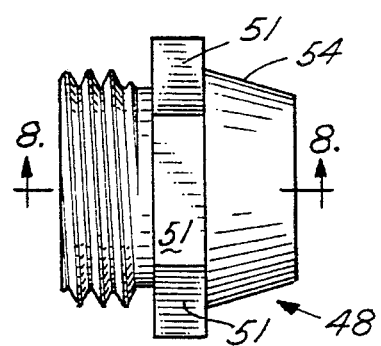
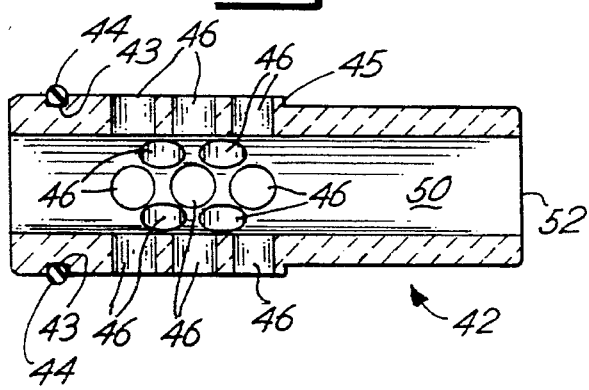
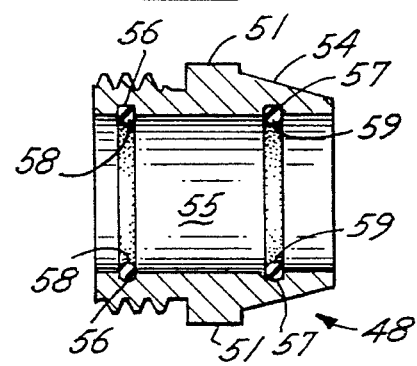
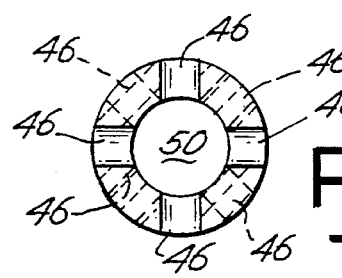
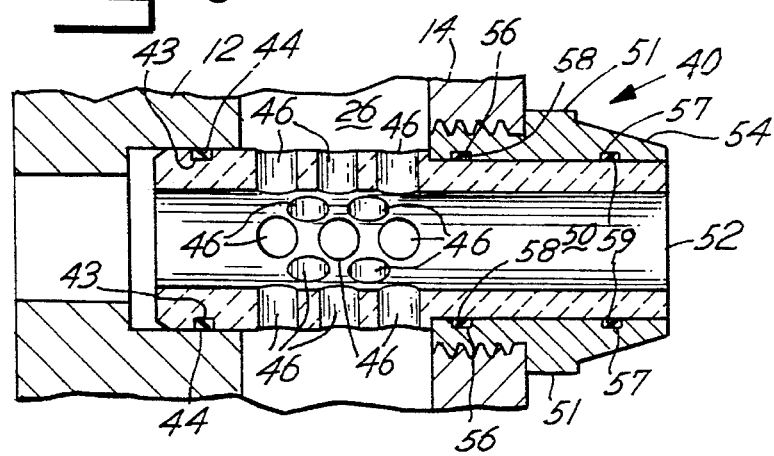

SPRAY NOZZLE INSERT AND METHOD FOR REDUCING WEAR IN SPRAY NOZZLES

This application is a continuation of application Ser. No. 08/227,053 filed Apr. 13, 1994 now abandoned.

BACKGROUND OF THE INVENTION

The present invention relates to spray nozzles that are used to spray abrasive suspensions or slurries. These spray nozzle designs are typically adapted to atomize a solids-containing liquid with a gas. Specifically, the present invention relates to a replaceable nozzle insert that can be constructed from a highly wear-resistant material and adapted to removably fit within an atomization port of a single- or multiple-port spray nozzle. Use of wear-resistant materials extends the overall life of the nozzle insert.

Spray nozzles similar to the type discussed herein are well known and have been used in a wide variety of applications, including spray drying, exhaust gas scrubbing and snow making, to name just a few. A few known multi-port spray nozzle designs are disclosed in U.S. Pat. Nos. 4,846,402 and 4,893,782. These spray nozzles are adapted to atomize a mixture of gas and liquid.

The atomization of solids-containing liquids, such as a lime slurry, can be extremely abrasive on the spray nozzles, and in particular on the atomization ports of the spray nozzles. When a particular application requires use of an abrasive liquid, the spray nozzles are typically sold with nozzle inserts that are adapted to fit within the atomization port or ports and that can be replaced after they become worn. The nozzles to date have been sold with replaceable nozzle inserts that are different from the nozzle insert of the present invention. As evidenced by U.S. Pat. Nos. 4,846,402 and 4,893,752, which are incorporated herein by reference, nozzle inserts are typically a single-piece, steel construction design having an upstream end adapted to threadably secure the nozzle insert into the inner body portion of the spray nozzle. Certain of these nozzle inserts include a necked-down portion for placement of an O-ring seal to create a seal between the nozzle insert and the atomization port, as disclosed by U.S. Pat. No. 4,846,402.

Unfortunately, however, such earlier nozzle insert designs are severely prone to erosion, especially when abrasive suspensions or slurries are atomized in the spray nozzles. While the steel construction of the earlier single-piece nozzle inserts is capable of supporting the necessary threads located at the upstream end of the inserts, the tool steel is not sufficiently resistant to erosion during spray nozzle use. Materials such as ceramics, for example, are not capable of supporting the threads required by the earlier nozzle insert designs. These materials are too brittle to be adequately threaded.

Accordingly, it is an object of the present invention to provide a replaceable nozzle insert design that provides for the use of highly abrasion-resistant materials in the construction of the replaceable nozzle inserts.

It is also an object of the present invention to provide a replaceable nozzle insert design that significantly increases the average life of nozzle inserts.

It is also an object of the present invention to provide a replaceable nozzle insert design that significantly reduces corrosion losses in severe environments, particularly in air pollution control acid gas reduction applications.

It is also an object of the present invention to provide a replaceable nozzle insert design that reduces the overall cost associated with nozzle insert replacement.

It is also an object of the present invention to provide a replaceable nozzle insert design that reduces the likelihood of complete nozzle insert damage, such as fracture for example, during nozzle insert installation, use, and/or removal.

SUMMARY OF THE INVENTION

These and other important objects are met by an improved nozzle insert and a method for significantly increasing the average life expectancy of nozzle inserts. The nozzle insert of the present invention is adapted to be placed in a spray nozzle for atomizing a mixture of a first fluid and a second fluid, typically a mixture of slurry and gas. The spray nozzle has a hollow body with a slurry inlet, a gas inlet and means fluidly connecting these inlets with at least one atomization port in a forward face of the nozzle. The nozzle insert is removably received in the atomization port. The interior fluid-conveying passage within the nozzle insert is fluidly connected to the liquid slurry inlet of the spray nozzle. The nozzle insert also has a plurality of gas flow passages for admitting gas into the interior fluid-conveying passage where the gas is then mixed with the liquid slurry. The downstream end of the nozzle insert has a spray outlet.

The improved features of the nozzle insert of the present invention include a two-piece design including an insert sleeve and an insert retaining cap. The insert sleeve portion of the nozzle insert has an interior fluid-conveying passage and gas flow passages. The insert sleeve can be removably received into the atomization and inner body ports of the spray nozzle. The insert retaining cap cooperates with both the insert sleeve and the spray nozzle to secure the insert sleeve in place in the spray nozzle. Because the insert retaining cap, rather than the upstream end portion of the spray nozzle, secures the nozzle insert in place in the spray nozzle, the insert sleeve may thereby be constructed from a material that is significantly more wear-resistant than the materials necessarily used to construct earlier nozzle inserts. Moreover, the failure of a particular nozzle insert of the present invention does not necessarily require complete replacement of the entire nozzle insert. The two-piece design allows undamaged portions of the nozzle insert to be reused, thus reducing nozzle insert replacement costs.

The present invention also comprises a method for significantly increasing the average life expectancy of nozzle inserts when used in spray nozzles. This is accomplished by positioning a removable nozzle insert in the atomization port or ports of the spray nozzle. The nozzle insert includes an insert sleeve and an insert retaining cap. The insert sleeve has an interior fluid-conveying and gas flow passages therein, and is constructed from a highly wear-resistant material such as, for example, ceramic. The insert sleeve is received into the atomization and inner body ports of the spray nozzle and the insert retaining cap cooperates with both the insert sleeve and the spray nozzle to secure the insert sleeve in place in the spray nozzle. In addition to increasing the average life expectancy of the entire nozzle insert, this method allows undamaged portions of worn or broken nozzle inserts to be re-used.

BRIEF DESCRIPTION OF THE DRAWING

FIG. 1 is a sectional view showing a spray nozzle having replaceable nozzle inserts according to a preferred embodiment of the present invention;

FIG. 2 is a schematic view of a spray dryer showing how nozzles containing the inserts of a preferred embodiment of the present invention may be used in spray drying;

FIG. 3 is an upward perspective view of a nozzle design having an exploded illustration of a nozzle insert in accordance with a preferred embodiment of the present invention;

FIG. 4 is a forward face view of a nozzle design in accordance with a preferred embodiment of the present invention;

FIG. 5 is a side view of an insert sleeve in accordance with a preferred embodiment of the present invention;

FIG. 6 is a sectional side view of an insert sleeve in accordance with a preferred : embodiment of the present invention;

FIG. 7 is a side view of an insert retaining cap in accordance with a preferred embodiment of the present invention;

FIG. 8 is a sectional side view of an insert retaining cap in accordance with a preferred embodiment of the present invention;

FIG. 9 is an axial sectional view of an insert sleeve in accordance with a preferred embodiment of the present invention; and FIG. 10 is a sectional side view of a preferred embodiment of a nozzle insert and sections of the body portions of the spray nozzle to illustrate the nozzle insert in position.

DESCRIPTION OF THE PREFERRED EMBODIMENTS

Referring first to FIGS. 1 and 3, there is shown a multi-port spray nozzle 10, often called a cluster nozzle, which is designed for two fluid applications. Spray nozzles such as these are used, for example, to atomize a liquid and gas mixture. While the figures depict only a multi-port spray nozzle, it will be understood by those skilled in the art that the nozzle insert of the present invention is equally suited for use in single-port nozzles. It will also be understood by those skilled in the art that the nozzle insert of the present invention could be adapted for use in single-fluid, or hydraulic, nozzles.

For purposes of illustration, the particular use described herein for the spray nozzle 10 relates to the atomization of a mixture of aqueous lime slurry and air in exhaust gas scrubbing applications. Those skilled in the art, however, will understand that there are a variety of applications in which the spray nozzle 10 and the present invention may be used. With respect to exhaust gas scrubbing applications, FIG. 2 depicts one particular arrangement of spray nozzles 10 within a spray drying chamber 66 in which hot combustion exhaust gases flow. The hot combustion gases flow in the direction indicated by arrow A, past and around the spray nozzles 10. In the embodiment depicted in FIG. 2, the atomized mixture of lime slurry and air is injected co-currently into (i.e., in substantially the same direction of flow as) the hot combustion exhaust gases. Other spray nozzle and flow arrangements, however, are also possible. For instance, the spray nozzles 10 may be mounted so that the atomized mixture of slurry and air is directed into spray dryer chamber 66 at an angle to, or even perpendicular to, the direction of hot combustion gas flow. Alternatively, the slurry and air mixture may be sprayed countercurrently into (i.e., in substantially the opposite direction of flow as) the hot combustion gases.

Referring now to FIG. 1, the spray nozzle 10 comprises an inner body portion 12 and an outer body portion 14. The body portions 12 and 14 may be fixed to one another by various means known to those skilled in the art. For example, a threaded arrangement similar to that shown in FIGS. 1, 4 and 6 of U.S. Pat. No. 4,893,752 may be used to secure body portions 12 and 14 together. Alternatively, a flange and bolt arrangement, as best shown in FIG. 1 herein, can be used for this purpose. The latter arrangement has been found to facilitate maintenance of the spray nozzle 10. The first fluid inlet 18 is located at the rear end of inner body portion 12 and may be threadably adapted to receive a first fluid inlet line (not shown) that is, in turn, connected to a fluid source, such as liquid slurry. The first fluid inlet line is thereby fluidly connected to the hollow interior space 20 of the inner body portion 12 through the first fluid inlet 18. This hollow interior 20 comprises a slurry manifold 21 which is, in turn, fluidly connected with a plurality of inner body ports 19. Thus, the liquid slurry is pumped from its source through the first fluid inlet line, enters the spray nozzle 10 through the first fluid inlet 18, flows through the hollow interior 20 of the inner body portion 12, and is distributed by the manifold 21 to the inner body ports 19.

A second fluid inlet 22 is located at the rear of the spray nozzle 10 for introduction of a second fluid, such as air, into the spray nozzle 10. The second fluid inlet 22 is adapted to receive a second fluid inlet line (not shown) which is, in turn, connected to the second fluid source. The second fluid inlet line can be connected to the second fluid inlet 22 in a variety of ways known to those of skill in the art, including a threaded connection or a flange and bolt arrangement. The second fluid inlet 22 is fluidly connected with the annular space 16 and the space 26, which are both formed between the inner and outer body portions 12 and 14. Thus, air is pumped from its source through the second fluid line, enters the spray nozzle 10 through the second fluid inlet 22, and then flows and is distributed throughout the spaces 16 and 26.

FIGS. 1, 3, 4 and 10 illustrate the positioning of a nozzle insert 40 in spray nozzle 10. The spray nozzle 10 has a forward face 28 with a plurality of atomization ports 30 therein. Each atomization port 30 is aligned with a particular inner body port 19. Each nozzle insert 40 extends from an inner body port 19 and through a corresponding atomization port 30. In FIGS. 1 and 4, a nozzle insert is absent from one set of aligned ports so that the spray nozzle 10 may be better illustrated. Those skilled in the art, however, will appreciate that each aligned pair of atomization ports 30 and inner body ports 19 typically has a nozzle insert 40 therein during operation of the spray nozzle 10.

Referring now to FIGS. 5–10, there is best illustrated the nozzle insert 40 of the present invention. The nozzle insert embodiment illustrated comprises an insert sleeve 42 and an insert retaining cap 48. The insert sleeve 42 may be constructed from, for example, a machined ceramic tube or a ceramic bar stock. The insert sleeve 42 could also be cast. In the illustrated embodiment, an interior fluid-conveying passage 50 passes completely through the nozzle insert 40 by passing completely through insert sleeve 42. The interior fluid-conveying passage shown in the figures is of constant diameter along the entire length of the nozzle insert 40, although a passage of varying diameter may be used. The interior fluid-conveying passage 50 terminates at the downstream end of the nozzle insert 40 at the spray outlet The highest spray nozzle velocity flow rates are typically found in the nozzle inserts 40. Not surprisingly, it has also been found that the highest wear rates usually occur in the nozzle inserts 40. This wear is attributed to the turbulent region of the spray nozzle where compressed air and abrasive liquid slurries combine in the interior fluid-conveying passage 50 of the nozzle inserts 40. The slurry and air mixture is then discharged through the spray outlet 52 of the nozzle insert 40 where expansion and atomization occurs.

The preferred nozzle insert 40 includes twenty gas flow passages 46 spaced around its circumference at 90° intervals, each gas flow passage 46 being 0.1 inches in diameter. As best shown in FIGS. 1 and 10, the gas flow passages 46 are located along the length of the insert sleeve 42 that fluidly communicates with the space 26 of the spray nozzle 10. It will be readily apparent to those skilled in the art that the present invention is not limited to the gas flow passage configuration described above. For example, a nine gas flow passage configuration was tested with 0.149-inch gas flow passages spaced at 120° intervals around the circumference of the insert sleeve 42. While the nine gas flow passage configuration was found to reduce the amount of slurry carry-over during nozzle operation as well as the amount of ceramic machining required to produce the nozzle insert, it has been determined that the twenty-hole configuration nevertheless provides a better nozzle spray pattern with less nozzle insert wear.

The downstream end of the insert sleeve 42 is of an appropriate diameter so that it may pass through the insert retaining cap 48. The downstream end of the insert sleeve 42 may also be necked-down at the circumference 45 to, when the insert sleeve 42 is secured in place by the insert retaining cap 48 as shown in FIG. 10, provide a locking ledge which thereby prevents the insert sleeve 42 of the nozzle insert 40 from sliding upstream through the insert retaining cap 48 during operation of the spray nozzle 10. The upstream end of the insert sleeve 42 is an appropriate diameter to be received in the corresponding inner body port 19, as shown in FIG. 10. A necked-down portion 43 at the upstream end of the insert sleeve 42 provides for placement of an O-ring seal 44 to ensure a proper seal between the insert sleeve 42 and the inner body portion 12 when the nozzle insert 40 is in position inside the spray nozzle 10. An O-ring seal 44 also provides a means for absorbing shock and vibration between the nozzle insert 40 and the spray nozzle 10 which, in turn, reduces the overall stresses on the nozzle insert 40 during nozzle insert replacement and spray nozzle operation. The preferred seal is a Viton O-ring seal. It will be understood by those skilled in the art that the same effect instead may be obtained by placing one or more O-ring seals in necked-down portions (not shown) of inner body port 19.

Referring now to FIGS. 7, 8 and 10, the insert retaining cap 48 is designed to removably fit over the upstream end of the insert sleeve 42. The insert retaining cap 48 may be constructed from a variety of materials, including but not limited to various types of steel, high chrome, brass, nickel alloys, plastic, and composite materials. The preferred insert retaining cap 48 is constructed from a carbon-steel material and has a titanium coating to resist corrosion. The insert retaining cap 48 has an exterior thread at its upstream end so that it may be threadably received and secured in the corresponding atomization port 30. The surfaces 51 are arranged so as to permit tightening and loosening of the insert retaining cap 48 in the spray nozzle 10 with the assistance of a wrench, socket or other tool. The inner retaining cap passage 55 is of a sufficient diameter so as to allow the insert retaining cap 48 to fit over the upstream portion of the insert sleeve 42. The necked-down portions 56 and 57 in the inner retaining cap passage 55, as best shown in FIGS. 8 and 10, allow for placement of the O-ring seals 58 and 59 to ensure a proper seal between the insert sleeve 42 and the insert retaining cap 48 when the nozzle insert 40 is in position in the spray nozzle 10. The O-ring seals 58 and 59 also provide a means for absorbing shock and vibration which, in turn, reduces the overall stresses on the nozzle insert 40 during nozzle insert replacement and spray nozzle operation. It will be understood by those skilled in the art that the same effect may be obtained by using only one O-ring seal in the inner retaining cap passage 55, or by instead placing one or more O-ring seals in necked-down portions (not shown) of the upstream end of the insert sleeve 42.

During operation, the slurry is pumped through the first fluid line, into the first fluid inlet 18 and distributed by the manifold 21 into the inner body ports 19. When the nozzle inserts 40 are engaged in the inner body ports 19, the slurry is directed through the interior passage 50 running through the nozzle inserts 40. A gas, typically air or steam, is pumped from the second fluid source through the second fluid line. The gas then enters the second fluid inlet 22 and, in turn, the spaces 16 and 26. The pressure at which the gas is pumped should be sufficient to maintain, at the location of the nozzle inserts 40, a level of pressure that is slightly greater than the pressure at which the liquid slurry is pumped through the nozzle inserts 40. In this way, the gas will flow into the interior fluid-conveying passage 50 through the gas flow passages 46 in each of the inserts 40, rather than liquid slurry flowing out of the gas flow passages 46. When atomizing a lime slurry, the slurry is typically pumped at a pressure of 30–80 psig and at a temperature of 150° F., while the gas (e.g., air) is pumped at a pressure of 35–85 psig. The gas and slurry are mixed together as the two fluids are pumped through the interior fluid-conveying passage 50 which, for this reason, is also called a mixing chamber. Thereafter, the two fluid mixture is discharged through the spray outlet 52.

As will be apparent to those who are skilled in the art, the present invention has many advantages over earlier nozzle insert designs and methods. The principal advantage of the present invention is that the mixing chamber portion of the nozzle insert can be constructed using materials that are significantly more wear-resistant than steel. Earlier single-piece nozzle insert designs call for materials such as steel because steel is a material that can be appropriately threaded. However, the average life of a nozzle insert 40 wherein the insert sleeve 42 is constructed using a ceramic material, for example, a material which cannot be appropriately threaded, has been found to be significantly longer than the average life of the earlier single-piece nozzle inserts constructed from steel.

Moreover, costs associated with nozzle insert replacement can be reduced by the present invention in that a worn insert sleeve 42 can be replaced with a new insert sleeve 42 and secured within the spray nozzle 10 using the original insert retaining cap 48. In this way, only the worn portion of the nozzle insert 40 is replaced; it will not always be necessary to replace the entire nozzle insert 40 configuration. Similarly, if the threads of the insert retaining cap 48 are damaged as a result of over-torquing during installation or removal of the nozzle insert, it will no longer be necessary to replace the entire nozzle insert assembly. Rather, a new insert retaining cap 48 can be used to secure the original insert sleeve 42 in the spray nozzle 10.

As best shown in FIGS. 7 and 8, the insert retaining cap 48 has a tapered surface 54 which ends at the spray outlet 52. When the surface 54 has a frusto-conical shape as best illustrated in FIG. 8 (i.e., the surface 54 is tapered inwardly when moving downstream toward the spray outlet 52), the angle, a, formed between the surface 54 and the interior fluid-conveying passage 50 should be in the range of about 10° to 50°, preferably about 15° to 30°. The surface 54 need not have a "flat" cross section as best shown in FIGS. 8 and 10, but may also be curved. When the surface 54 has a curved cross section, the angle, a, can be determined by drawing a tangent line through a point on the curved surface 54, as will be appreciated by those skilled in the art. The surface 54 preferably has a high degree of smoothness and a low frictional coefficient. This can be accomplished either by polishing the surface 54 or by employing a Teflon™, Silverstone™, or other similar coating thereon.

When an atomized mixture of slurry and air is sprayed into flowing hot combustion exhaust gases, eddy currents from along the forward face 28 of the spray nozzle 10. As described in U.S. Pat. No. 4,846,402, which is incorporated herein by reference, the eddy currents have a tendency to entrain a small portion of the atomized liquid, causing it to deposit on the forward face 28. The water eventually evaporates leaving a hard crusty deposit of the solids contained in the slurry. Also deposited are any solid particulates, such as fly ash, contained in the hot combustion exhaust gases and contained in the entrained liquid. A third component of the deposited solids is the solid reaction product(s) between the acid gas components of the hot combustion gases and the alkaline slurry (for example, solid calcium sulfate which is the reaction product between SOx gases and a CaOH slurry). These solid reaction products can also be carried and deposited on the forward face 28 of the spray nozzle 10 and contribute to the amount of solids built up on the forward face 28.

A number of parameters can effect the degree and severity of eddy currents forming along the forward face 28 of the spray nozzle 10. These include, for example, the configuration of the lance, the velocity and direction of the flow of hot combustion gases in relation to the positioning of the spray nozzle 10, the inlet temperature of the hot combustion gases, the concentration of solid particulates in the hot combustion gases, the spray dryer outlet temperature, and the solids content of the atomized slurry. A protective lance (not shown) may be provided to minimize the severity of these eddy currents. The interior of the lance may be connected to a supply of air at ambient pressure. When the spray nozzle 10 is positioned to spray the mixture of slurry and gas in a countercurrent direction with respect to the flow of hot combustion gases, however, it may be necessary to supply air through the interior of the lance at a slightly positive pressure with respect to the pressure of the flowing hot combustion gases in the vicinity of the spray nozzle 10. As the hot combustion exhaust gases flow past the lance, ambient air is drawn or pumped out of the lance and into the conduit or chamber (not shown) which is typically maintained at a slightly negative pressure. This helps protect the spray nozzle 10 from becoming too hot and also helps protect the spray nozzle 10 from exposure to corrosive acid gases. In addition, the strength and severity of the eddy currents forming along face 28 are thereby reduced. However, even when a lance is provided there is still a tendency for eddy currents to form in the vicinity of the forward face 28.

For this reason, the insert retaining cap 48 of each nozzle insert 40 extends outwardly beyond the forward face 28 of the spray nozzle 10, as best shown in FIGS. 1, 3, and 10. Preferably, the insert retaining cap 48 extends a sufficient distance beyond the forward face 28 so that the spray outlet 52 is positioned substantially beyond the afore-mentioned eddy currents. Those skilled in the art will appreciate that the "depth" of the eddy currents, as measured from the forward face 28, can vary depending on the operating parameters of the system, including, for example, the presence or absence of a lance, the lance configuration, the velocity and direction of flow of the hot combustion exhaust gases, the inlet temperature of the hot combustion gases, the concentration of solid particulates in the hot combustion gases, the spray dryer outlet temperature, and the solids concentration in the atomized slurry. Accordingly, the optimum length for the insert retaining cap 48 will also vary with these same operating parameters.

In any event, the optimum length for the insert retaining cap 48 can be determined by routine experimentation. In general, the length of the insert retaining cap 48 should be long enough to position the spray outlet 52 substantially beyond the eddy currents flowing across forward face 28, but not so long that the spray outlet 52 extends substantially beyond the drafting effect of the spray nozzle 10 and lance, if used, so that the spray outlet 52 is positioned directly in the flow of hot combustion exhaust gases. If the length of the insert retaining cap 48 is too long so that the spray outlet 52 is positioned directly in the flow of the hot gases, there is a tendency for any solids build-up which does form to become very dry and hard, thereby making removal difficult. In typical coal-fired boiler exhaust gas scrubbing applications where the slurry is sprayed co-currently with the hot combustion gases, the inlet temperature of the hot combustion gases is in the range of 350° to 450° F., the particulate concentration in the hot combustion gases is in the range of 1–5 grains/SCF, the hot combustion gases have a residence time in the spray drying chamber of 8–15 seconds, the spray dryer outlet temperature is in the range of 20° to 60° F. above the adiabatic saturation temperature, the solids content of the slurry is in the range of 3–17 wt. % (assuming an aqueous calcium hydroxide slurry), the slurry and air mixture is sprayed in a co-current direction with the flow of hot combustion gases and a lance is provided, the insert retaining cap 48 will typically extend beyond the forward face 28 approximately ¼ to ¾ inch. In other applications, however, the insert retaining cap 48 may extend beyond the forward face 28 a distance of up to about 2 inches. By positioning the spray outlet 52 substantially beyond the eddy currents, lesser amounts of the atomized liquid are entrained by the eddy currents and deposited on the insert retaining cap 48 and the forward face 28, thereby greatly reducing the rate of solids build-up on the spray nozzle 40.

Turning now to FIG. 2, there is illustrated an apparatus for scrubbing hot combustion exhaust gases in order to remove certain components thereof. The apparatus includes a spray dryer 60 having an entrance gas duct 62, an exit gas duct 64, a spray drying chamber 66 and a solids removal line 68. Apparatus of this type (with the exception of the spray nozzles 10 positioned therein) are well known in the art as disclosed in Gehri et al., U.S. Pat. No. 4,197,278, incorporated herein by reference. Hot flue gases are conducted through the entrance gas duct 62 into the spray drying chamber 66. These gases predominantly comprise products of combustion, such as carbon dioxide and water, but may also contain certain components which are desirably removed before venting the gases to the atmosphere. The undesirable components can include acid gases such as SOx, HX, NOx and particulates such as fly ash. In order to remove these components from the hot combustion exhaust gases, an aqueous alkaline slurry is typically pumped through the first fluid line to the rear end of the spray nozzles 10, and sprayed out the spray nozzles 10. As a part of this process, the alkaline slurry is mixed with a gas, typically air or steam, which is fed through the second fluid line to the spray nozzles 10, and then mixed with the slurry in the spray nozzles 10 during atomization.

Typical solids-containing liquid slurries include aqueous slurries of calcium hydroxide, calcium carbonate, sodium carbonate, sodium bicarbonate, sodium hydroxide, magnesium hydroxide, magnesium carbonate and aluminum oxide. Those skilled in the art will realize that solids-containing liquid slurries other than aqueous slurries may also be used. These solids-containing slurries encompass not only slurries in which solid insoluble particles are suspended in a liquid, such as water, but also slurries in which solid soluble particles are suspended in a liquid, such as aqueous slurries of sodium carbonate and sodium bicarbonate.

The alkaline slurry reacts with the acid gas components in the hot combustion exhaust gases, forming solid reaction products such as calcium sulfate, sodium sulfate and/or magnesium sulfate as is well-known to those skilled in the art of scrubbing exhaust gases. A small portion of the solids produced by this reaction are collected and conveyed out of the spray drying chamber 66 through the solids removal line 68. The remainder of the solids are collected downstream from the solids removal line 64 in a particulate collection device (not shown) such as a fabric filter, a mechanical collector, an electrostatic precipitator, or similar device.

In addition to exhaust gas scrubbing applications, the apparatus illustrated in FIG. 2 may be used in spray drying, spray cooling, spray reaction and spray absorption applications. Of course a wide variety of substances may be sprayed in a variety of other applications using the nozzle insert and method of the present invention. In spray drying applications, products which may be spray dried include foods such as, for example, powdered cocoa, instant coffee, powdered milk, powdered eggs, and powdered instant beverages such as tea and fruit drinks. Additional spray dried products include catalysts, resins, detergents, plastics and fertilizers, as well as pharmaceutical/biochemical products such as enzymes, antibiotics, yeasts, vitamins and others. Many of these products are atomized using water as a solvent, although in certain applications such as the above-mentioned pharmaceutical/biochemical applications, organic solvents such as acetone, trichloroethylene, methylene chloride, and ethanol are more typically used. Organic solvents may also be used in chemical applications when making plastics such as polymer powders.

It is believed that in most of the above-mentioned applications, the spray nozzles are to a certain degree subject to the same solids build-up problems as are spray nozzles used to spray aqueous alkaline solutions in hot combustion exhaust gas streams. For example, in the spray drying of foods, the food is typically conveyed to the nozzle in the form of aqueous slurry of the solid food product. When the slurry is atomized, it is believed that some of the solid food is deposited on the face of the nozzle in a similar fashion as was described with the deposit of lime on the forward face of a nozzle used to atomize a lime slurry in gas scrubbing applications. The embodiment of the nozzle insert and method of the present invention described and illustrated herein reduce the rate of solids build-up in these additional applications.

When spray drying food, the liquid slurry is introduced into the nozzles 10 through the first fluid line and is usually mixed with air introduced through the second fluid lines into the spray nozzles 10. Likewise, the hot drying gas introduced through the entrance gas duct 62 is also air. The solids-containing liquid slurry is sprayed through the spray nozzles 10 into the flow of hot drying gas introduced through the entrance gas duct 62 and flowing downwardly through the spray drying chamber 66. A portion of the spray dried solid product is recovered at the bottom of the spray drying chamber 66 through the solids removal line 68 while the remaining spray dried product is carried out of the spray drying chamber 66 through the exit gas duct 64 and recovered downstream in a suitable particulate collection device (not shown) as described above.

Although certain embodiments of the invention have been described and illustrated herein, it will be readily apparent to those skilled in the art that a number of modifications and substitutions can be made without departing from the spirit of the invention. Therefore, the true scope and spirit of this invention are defined by the following claims, and their equivalents, to be interpreted in light of the foregoing specification.

What is claimed is:

1. An improved nozzle insert for use in a spray nozzle for atomizing a two fluid mixture, the spray nozzle having a hollow body with a first fluid inlet, a second fluid inlet, and means fluidly connecting the first and second fluid inlets with at least one atomization port in a forward face of the spray nozzle, the improved nozzle insert adapted to be removably received in the atomization port, the improved nozzle insert having an interior fluid-conveying passage therethrough, the interior fluid-conveying passage being fluidly connectable with the first fluid inlet and having at least one second fluid flow passage for admitting a second fluid into the interior fluid-conveying passage for mixing with a first fluid therein, the nozzle insert having a spray outlet at a downstream end thereof, the improvement comprising said nozzle insert having an insert sleeve, which forms the interior fluid-conveying passage, and a separable insert retaining means for cooperating with the insert sleeve to secure the insert sleeve in the spray nozzle, the insert sleeve having a downstream end which forms the spray outlet of the nozzle insert.

2. The improved nozzle insert of claim 1, wherein the insert sleeve includes means for retaining at least one seal for sealing engagement with the spray nozzle.

3. The improved nozzle insert of claim 2, wherein the means for retaining at least one seal is an annular recessed area around an upstream end of the insert sleeve.

4. The improved nozzle insert of claim 1, wherein the insert sleeve includes means for retaining at least one seal for sealing engagement with the insert retaining means.

5. The improved nozzle insert of claim 4, wherein the means for retaining at least one seal is an annular recessed area near the downstream end of the insert sleeve.

6. The improved nozzle insert of claim 1, wherein an outside diameter of the downstream end of the insert sleeve is smaller than an outside diameter of an upstream end of the insert sleeve.

7. The improved nozzle insert of claim 1, wherein the downstream end of the insert sleeve is a first constant outside diameter for an axial portion of the insert sleeve and wherein an upstream end of the insert sleeve is a second constant outside diameter for a remaining axial portion of the insert sleeve, the second constant outside diameter being larger than the first constant outside diameter.

8. The improved nozzle insert of claim 1, wherein the insert retaining means is an insert retaining cap having an interior passage through which the insert sleeve is received and an exterior thread at an upstream end of the insert retaining cap for engagement with the atomization port of the spray nozzle.

9. The improved nozzle insert of claim 8, wherein the insert retaining cap includes means for retaining at least one seal for sealing engagement with the insert sleeve.

10. The improved nozzle insert of claim 9, wherein the means for retaining at least one seal is an annular recessed area around the interior passage of the insert retaining cap.

11. In combination with a spray nozzle for atomizing a two fluid mixture, the spray nozzle having a hollow body with a first-fluid inlet, a second fluid inlet and means fluidly connecting the first and second fluid inlets with at least one atomization port in a forward face of the spray nozzle, an improved nozzle insert removably received in the atomization port, the nozzle insert having an interior fluid-conveying passage therethrough, the interior fluid-conveying passage being fluidly connected to the first fluid inlet and having at least one second fluid flow passage for admitting a second fluid into the interior fluid-conveying passage for mixing with a first fluid therein, the nozzle insert having a spray outlet at the downstream end thereof, the improvement comprising said nozzle insert having an insert sleeve, which forms the interior fluid-conveying passage, and a separable insert retaining means for cooperating with the insert sleeve to secure the insert sleeve in the spray nozzle, the insert sleeve having a downstream end which forms the spray outlet of the nozzle insert.

12. The apparatus of claim 11, wherein the spray nozzle has a plurality of atomization ports in the forward face of the spray nozzle, each of the atomization ports having the improved nozzle insert removably received therein.

13. A spray dryer containing at least one spray nozzle in a spray drying chamber, the spray nozzle having a hollow body with a first-fluid inlet, a second fluid inlet and means fluidly connecting the first and second fluid inlets with at least one atomization port in a forward face of the spray nozzle, an improved nozzle insert removably received in the atomization port, the nozzle insert having an interior fluid-conveying passage therethrough, the interior fluid-conveying passage being fluidly connected to the first fluid inlet and having at least one second fluid flow passage for admitting a second fluid into the interior fluid-conveying passage for mixing with a first fluid therein, the nozzle insert having a spray outlet at the downstream end thereof, the improvement comprising said nozzle insert having an insert sleeve, which forms the interior fluid-conveying passage, and a separable insert retaining means for cooperating with the insert sleeve to secure the insert sleeve in the spray nozzle, the insert sleeve having a downstream end which forms the spray outlet of the nozzle insert.

14. A method of increasing the life of a nozzle insert used in a spray nozzle that atomizes a mixture of a first fluid and a second fluid, the spray nozzle having a hollow body with a first fluid inlet, a second fluid inlet and means fluidly connecting the first and second fluid inlets with at least one atomization port in a forward face of the spray nozzle, comprising the steps of:

(a) removably securing the nozzle insert in the atomization port, the nozzle insert having an insert sleeve, which forms an interior fluid-conveying passage, and a separable insert retaining means for cooperating with the insert sleeve to secure the insert sleeve in the spray nozzle, the insert sleeve having a downstream end which forms a spray outlet of the nozzle insert;

(b) pumping the mixture through the interior fluid-conveying passage and out of the spray outlet.

15. The method of claim 14, wherein the first fluid is an aqueous alkaline slurry.

16. The method of claim 14, wherein the first fluid is selected from the group consisting of aqueous slurries of calcium hydroxide, calcium carbonate, sodium carbonate, sodium bicarbonate, sodium hydroxide, magnesium hydroxide, magnesium carbonate, aluminum oxide and mixtures thereof.

17. The method of claim 14, wherein the second fluid is selected from air and steam.

18. The method of claim 14, wherein the mixture is atomized into a flowing gas stream.

19. The method of claim 18, wherein the first fluid is an aqueous alkaline slurry and the flowing gas stream comprises hot combustion exhaust gases.

20. An improved nozzle insert for use in an atomization spray nozzle, the spray nozzle having a hollow body with a fluid inlet and means fluidly connecting the fluid inlet with at least one atomization port in a forward face of the spray nozzle, the improved nozzle insert adapted to be removably received in the atomization port, the improved nozzle insert having an interior fluid-conveying passage fluidly connectable with the fluid inlet, the nozzle insert having a spray outlet at a downstream end thereof, the improvement comprising said nozzle insert having an insert sleeve, which forms the interior fluid-conveying passage, and a separable insert retaining means for cooperating with the insert sleeve to secure the insert sleeve in the spray nozzle, the insert sleeve having a downstream end which forms the spray outlet of the nozzle insert.

21. An improved nozzle insert for use in a spray nozzle for atomizing a two fluid mixture, the spray nozzle having a hollow body with a first fluid inlet, a second fluid inlet, and means fluidly connecting the first and second fluid inlets with at least one atomization port in a forward face of the spray nozzle, the improved nozzle insert adapted to be removably received in the atomization port, the improved nozzle insert having an interior fluid-conveying passage therethrough, the interior fluid-conveying passage being fluidly connectable with the first fluid inlet and having at least one second fluid flow passage for admitting a second fluid into the interior fluid-conveying passage for mixing with a first fluid therein, the nozzle insert having a spray outlet at a downstream end thereof, the improvement comprising said nozzle insert having an insert sleeve, a separable insert retaining means for cooperating with the insert sleeve to secure the insert sleeve in the spray nozzle, and means disposed between the cooperating insert sleeve and the insert retaining means for absorbing shock between the insert sleeve and the insert retaining means.

22. In combination with a spray nozzle for atomizing a two fluid mixture, the spray nozzle having a hollow body with a first-fluid inlet, a second fluid inlet and means fluidly connecting the first and second fluid inlets with at least one atomization port in a forward face of the spray nozzle, an improved nozzle insert removably received in the atomization port, the nozzle insert having an interior fluid-conveying passage therethrough, the interior fluid-conveying passage being fluidly connected to the first fluid inlet and having at least one second fluid flow passage for admitting a second fluid into the interior fluid-conveying passage for mixing with a first fluid therein, the nozzle insert having a spray outlet at the downstream end thereof, the improvement comprising said nozzle insert having an insert sleeve, a separable insert retaining means for cooperating with the insert sleeve to secure the insert sleeve in the spray nozzle, and means disposed between the cooperating insert sleeve and the insert retaining means for absorbing shock between the insert sleeve and the insert retaining means.

23. A spray dryer containing at least one spray nozzle in a spray drying chamber, the spray nozzle having a hollow body with a first-fluid inlet, a second fluid inlet and means fluidly connecting the first and second fluid inlets with at least one atomization port in a forward face of the spray nozzle, an improved nozzle insert removably received in the atomization port, the nozzle insert having an interior fluid-conveying passage therethrough, the interior fluid-conveying passage being fluidly connected to the first fluid inlet and having at least one second fluid flow passage for admitting a second fluid into the interior fluid-conveying passage for mixing with a first fluid therein, the nozzle insert having a spray outlet at the downstream end thereof, the improvement comprising said nozzle insert having an insert sleeve, a separable insert retaining means for cooperating with the insert sleeve to secure the insert sleeve in the spray nozzle, and means disposed between the cooperating insert sleeve and the insert retaining means for absorbing shock between the insert sleeve and the insert retaining means.

24. A method of increasing the life of a nozzle insert used in a spray nozzle that atomizes a mixture of a first fluid and a second fluid, the spray nozzle having a hollow body with a first fluid inlet, a second fluid inlet and means fluidly connecting the first and second fluid inlets with at least one atomization port in a forward face of the spray nozzle, comprising the steps of:

(a) removably securing the nozzle insert in the atomization port, the nozzle insert having an insert sleeve, which forms an interior fluid-conveying passage, a separable insert retaining means for cooperating with the insert sleeve to secure the insert sleeve in the spray nozzle, and means disposed between the cooperating insert sleeve and the insert retaining means for absorbing shock between the insert sleeve and the insert retaining means;

(b) pumping the mixture through the interior fluid-conveying passage and out of the spray nozzle.

25. An improved nozzle insert for use in an atomization spray nozzle, the spray nozzle having a hollow body with a fluid inlet and means fluidly connecting the fluid inlet with at least one atomization port in a forward face of the spray nozzle, the improved nozzle insert adapted to be removably received in the atomization port, the improved nozzle insert having an interior fluid-conveying passage fluidly connectable with the fluid inlet, the nozzle insert having a spray outlet at a downstream end thereof, the improvement comprising said nozzle insert having an insert sleeve, a separable insert retaining means for cooperating with the insert sleeve to secure the insert sleeve in the spray nozzle, and means disposed between the cooperating insert sleeve and the insert retaining means for absorbing shock between the insert sleeve and the insert retaining means.

* * * * *